(12) United States Patent
Matviya (10) Patent No.: US 7,628,973 B2
(45) Date of Patent: Dec. 8, 2009

(54) SIMULTANEOUS PRODUCTION OF HIGH DENSITY CARBON FOAM SECTIONS

(75) Inventor: Thomas M. Matviya, McKees Rocks, PA (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 11/619,223

(22) Filed: Jan. 3, 2007

(65) Prior Publication Data

US 2007/0128102 A1  Jun. 7, 2007

Related U.S. Application Data

(63) Continuation-in-part of application No. 11/393,308, filed on Mar. 30, 2006.

(60) Provisional application No. 60/594,355, filed on Mar. 31, 2005.

(51) Int. Cl.
   *C01B 31/02* (2006.01)
   *C01B 31/00* (2006.01)
   *C01B 31/04* (2006.01)
   *C10L 5/00* (2006.01)

(52) U.S. Cl. .................. 423/445 R; 423/448; 44/620

(58) Field of Classification Search .............. 44/620; 423/445 R, 448; 429/231.8
   See application file for complete search history.

(56) References Cited

U.S. PATENT DOCUMENTS 4,055,614 A * 10/1977 Morikawa et al. ........... 264/630
4,234,386 A * 11/1980 Stirling ........................ 201/6
6,506,354 B1 * 1/2003 Stiller et al. ............ 423/445 R
6,646,238 B1 * 11/2003 Fuhr et al. ................... 219/521
6,797,251 B1 * 9/2004 Bennett et al. .......... 423/445 R
6,899,970 B1 * 5/2005 Rogers et al. ................. 429/27
2003/0070364 A1 * 4/2003 Rogers et al. ................. 51/307
2005/0204613 A1 * 9/2005 Lucas et al. ................... 44/620

* cited by examiner

Primary Examiner—Jerry Lorengo
Assistant Examiner—Noah S Wiese
(74) Attorney, Agent, or Firm—Philip Lane (57) ABSTRACT

The present invention includes methods for simultaneously producing, within a single container, two or more sections of high density carbon foam materials of defined shape. A method used to prepare high density carbon foam sections may involve heating a comminuted agglomerating bituminous coal bed, that is at least partially divided into two or more sections by the use of partitions within the coal bed, to an elevated temperature sufficient to result in the coal particles softening and melting together to form sections of a generally homogeneous, continuous, open cell carbon material. The sections of homogeneous open cell carbon material are then maintained at an elevated temperature for a period of time sufficient to substantially reduce or essentially eliminate the plastic properties of the bituminous coal. As desired, the resultant high density carbon foam sections may be cooled to essentially ambient temperatures or immediately or subsequently heated to elevated temperatures as great as about 3200° C., followed by cooling.

21 Claims, 7 Drawing Sheets

SIMULTANEOUS PRODUCTION OF HIGH DENSITY CARBON FOAM SECTIONS

CROSS-REFERENCE TO RELATED APPLICATIONS

This application is a continuation-in-part of U.S. patent application Ser. No. 11/393,308, filed Mar. 30, 2006 entitled "High Density Carbon Foam", which is based on U.S. Provisional Patent Application No. 60/594,355, filed on Mar. 31, 2005, and which both applications are herein specifically incorporated by reference in their entireties.

STATEMENT OF FEDERALLY SPONSORED RESEARCH OR DEVELOPMENT

This invention was made with Government support under contract number W9113M-05-C-0125 awarded by the U.S. Army Space and Missile Defense Command. The Government has certain rights in the invention.

FIELD OF THE INVENTION

The present invention is directed to a method for simultaneous production of two or more sections of high density porous carbon materials, and in particular, to high density carbon foams.

BRIEF SUMMARY OF THE INVENTION

The present invention includes methods for simultaneously producing, within a single container, two or more sections of high density carbon foam materials of defined shape. In some embodiments, the method used to simultaneously prepare two or more sections of high density carbon foam of defined shape within a single container involves heating a bed of comminuted agglomerating bituminous coal, divided by at least one partition, within a container to an elevated temperature sufficient to result in the coal particles softening and melting together to form two or more pieces, or sections, of a generally homogeneous, continuous, open cell carbon material. The sections of homogeneous open cell carbon material are then maintained at an elevated temperature for a period of time sufficient to substantially reduce or essentially eliminate the plastic properties of the homogeneous open cell carbon material to result in two or more sections of high density carbon foam of defined shape. As desired, the resultant high density carbon foam sections may be cooled to essentially ambient temperatures or immediately or subsequently heated to elevated temperatures as great as about 3200° C., followed by cooling.

In certain embodiments, the invention may include a method for simultaneously producing sections of high density carbon foam of defined shape, within a single container, comprising the steps of heating a bed, divided by one or more partitions, of solid, particulate, agglomerating carbonaceous feedstock to a first elevated temperature, where the first elevated temperature is sufficient to cause the agglomerating carbonaceous feedstock particles to become softened, at least partially melt, and intermix to form sections of a substantially homogeneous, non-sintered, open cell carbon material, and continued heating of the carbon material sections at an elevated temperature for a time period sufficient that the carbon material is no longer plastic or capable of becoming plastic to result in sections of high density carbon foam of defined shape. As desired, the resultant high density carbon foam sections may be cooled to essentially ambient temperatures or immediately or subsequently heated to elevated temperatures as great as about 3200° C., followed by cooling.

In some embodiments, the invention may also include a method for simultaneously producing sections of high density carbon foam of defined shape, the method comprising the steps of loading a container having one or more partitions with comminuted coal to form a coal bed having two or more section as defined by the partitions and container walls, where the comminuted coal is an agglomerating bituminous coal, covering a bottom surface of the container with a bottom surface covering, where the bottom surface covering is positioned at the bottom surface of at least one section of the coal bed. The method may also include covering at least one of the coal bed sections with one or more coal bed coverings, placing a rigid sheet material over at least one of the coal bed coverings, covering the container with a lid, heating the coal bed to a first elevated temperature, wherein the first elevated temperature is sufficient to cause the coal particles to become softened, at least partially melt, and intermix to form substantially homogeneous, non-sintered, open cell carbon material, and continued heating of the carbon material at an elevated temperature for a time period sufficient that the carbon material is no longer plastic or capable of becoming plastic to result in two or more sections of high density carbon foam. As desired, the resultant high density carbon foam sections may be cooled to essentially ambient temperatures or immediately or subsequently heated to elevated temperatures as great as about 3200° C.

DETAILED DESCRIPTION OF EMBODIMENTS OF THE INVENTION

Various embodiments for the production of two or more pieces, or sections, of high density carbon foam of at least partially defined geometry from a coal bed within a single container are described. Some embodiments may generally utilize the methods taught in U.S. patent application Ser. No. 11/393,308 filed Mar. 30, 2006 for the production of high density carbon foam, which is herein specifically incorporated by reference in its entirety. Generally, two or more pieces, or sections, of high density carbon foam may be formed by at least partially dividing the coal bed within the container into two or more sections, areas, or divisions, by use of at least one partition. In some embodiments, processing of the resultant divided coal bed by the teachings of U.S. patent application Ser. No. 11/393,308 provides two or more pieces, or sections, of high density carbon foam having geometries at least partially defined by the container walls and the partition.

High density carbon foams are those carbon foams, that when heated to temperatures greater than about 700, and more typically greater than about 950, even to temperatures greater than or equal to about 3200° C., followed by cooling to essentially ambient temperatures, may exhibit densities greater than about 1. g/cc. In other embodiments, the densities may range from about 1.2 g/cc to about 1.8 g/cc. In still other embodiments, the densities may range from about 1.3 g/cc to about 1.6 g/cc. To the unaided eye, such high density carbon foams may appear to be non-porous solids. However, optical microscopic examination at 10× to 100× may show such high density carbon foams have some degree of porosity. In some embodiments, this porosity is evenly distributed in the foam. The porosity of the high density carbon foams provides void volumes within the foam that are predominately in communication with one another and with the exterior of the foam, thus providing a structure that may be referred to as "open celled" or "porous".

In some embodiments, optical microscopic examination at a magnification of about 90× shows the high density carbon foams are not simply comprised of sintered powders. That is, the vast majority of the coal particulates from which the foam was prepared are predominantly no longer recognizable as individual particles bonded together only at their areas of mutual contact, as would be the case in a sintered material. The high density carbon foam may be comprised of defined, regular, void spaces delimited by thick, somewhat curved, interconnected carbon ligaments, which result in a continuous, open-celled, foam-like dense carbon body. The void spaces of the high density carbon foam materials are typically significantly smaller and the interconnecting ligaments are relatively thicker than those observed in low density coal based carbon foams. Additionally, the void volumes of the high density carbon foam may not exhibit the well defined spherical-like void volume geometry typically observed in low density carbon foam.

In other embodiments, the structure of the high density carbon foam may appear, under microscopic examination at about 90×, to be comprised of numerous randomly interconnected and intertwined carbon ligaments of random size and orientation. Such interconnected ligaments are continuous through the high density carbon foam. The surfaces of these ligaments may be curved and relatively smooth, non-uniform, irregular, or in rare instances even occasionally be embedded with what may be the remains of minute amounts of coal particles that did not achieve a high degree of plastic character. Without intending to be bound by theory, it is believed that such remains of coal particles may be comprised of inertinite and other similar non-plasticizable materials found in coal. Void spaces defined by the ligaments may be of random size and shape with limited, if any, spherical characteristics. In some embodiments, the size and number of void spaces may be inversely related to the density of the high density carbon foam. That is, higher density high density carbon foams may exhibit fewer, and smaller, void volumes than do lower density high density carbon foams. Additionally, higher density high density carbon foams may exhibit thicker ligaments than do lower density high density carbon foams.

High density carbon foams, when heated to temperatures greater than about 700° C., and more typically greater than about 950° C., followed by cooling to essentially ambient temperatures, may have crush strengths (i.e., compressive strengths, ASTM C368) greater than about 5,000 lbs/in$^2$, in some embodiments greater than about 10,000 lbs/in$^2$, and in other embodiments greater than about 20,000 lbs/in$^2$. Some high density carbon foams may be electrically conductive. High density carbon foams may also exhibit good thermal transport properties. In some embodiments, the bodies of these high density foams may be largely isotropic.

The high density carbon foam may be useful in a variety of applications, for example, as ablation shields, blast shields, heat barriers, kiln furniture, rocket nozzles, impact shields, heat exchangers, and thermal protection systems. The high density carbon foam may be also be useful as electrodes (including alkali-metal electrodes), current collectors, bipolar plates, catalyst supports, bearings, leading edge surfaces, tooling face sheets, tool body sections, drawing dies, pultrusion dies, extrusion dies, pencil leads, optical benches, fixturing, conductive work surfaces, heat resistant work surfaces, carbon composite fasteners and associated hardware, and friction materials. The high density carbon foam may also be used in blast protection systems, ballistic protection systems, and as materials in other applications requiring high compressive strengths, tolerance to high temperatures, resistance to thermal shock, and/or thermal conductivities within the ranges exhibited by the high density carbon foams. Further, the high density carbon foam may be used in many applications in which graphite has previously been used. As desired, the ash content of the high density carbon foam may be reduced by known techniques including treatment with acids and/or exposure to halogen gases.

As desired, the surface of the high density carbon foam may be surfaced coated, covered, or faced with other materials using conventional methods. These other materials may extend from the high density carbon foam. Such other materials may provide, for example, additional high density carbon foam strength, bracing, waterproofing, impact resistance, and the like. Such other materials may include, but are not limited to, carbon foam, fiberglass, thermosetting and thermoplastic polymers, polymeric composites, carbon composites, paint, ceramics, carbides, wood, paper, metals, metal composites, and the like. Such other materials may be applied, for example, by dipping, spraying (including thermal spraying), hand lay-up methods, painting, gluing, mechanical fasteners, deposition (including chemical vapor deposition and vacuum deposition), and the like. The high density carbon foam may also be impregnated with thermosetting or thermoplastic polymers, ceramics, and the like. Such impregnation may provide for additional high density carbon foam strength, bracing, waterproofing, impact resistance, and the like. High density carbon foam may be machined with conventional tooling. Due to the strength and hardness exhibited by some of the high density carbon foam materials, carbide or diamond tipped tooling implements are recommended. Sections of high density carbon foam may be bonded to other sections of high density carbon foam using conventional adhesives and techniques.

In some embodiments, the method used to prepare high density carbon foam may include heating an agglomerating carbonaceous feedstock to an elevated temperature sufficient to result in the feedstock particles softening and melting together to form a generally homogeneous, continuous, open cell carbon material. The homogeneous open cell carbon material is then maintained at an elevated temperature for a period of time sufficient to substantially reduce or essentially eliminate the plastic properties of the carbon material to result in high density carbon foam. As desired, the resultant high density carbon foam may be cooled to essentially ambient temperatures or immediately or subsequently heated to elevated temperatures as great as about 3200° C., followed by cooling.

In some embodiments the agglomerating carbonaceous feedstocks may include, but are not limited to, agglomerating bituminous coals. As such, the high density carbon foams may be prepared directly from agglomerating bituminous coals. Suitable agglomerating bituminous coals are those coals that become plastic (i.e. softened) when heated. Such coals may be those having a Free Swell Index (ASTM Standards D720-67, "Standard Method of Test for Free—Swelling Index of Coal") of greater than about 1, and in some embodiments greater than about 2. In some embodiments, the coal may have a Free Swell Index greater than about 5. The bituminous coals may be of any bituminous coal rank including Low Volatile, Medium Volatile, High Volatile A, High Volatile B, and High Volatile C bituminous coals. Blends of bituminous coals may be utilized providing the resultant blend is agglomerating and corresponds to the Free Sell Index parameters discussed above. In some embodiments, high density carbon foams prepared from suitable bituminous coals, such as some Low Volatile bituminous coals, may be graphitizable. In other embodiments, high density carbon foams prepared from suitable bituminous coals, such as some High Volatile bituminous coals, may be very hard and non-graphitizable. In still other embodiments, carbon foams prepared from suitable bituminous coals, such as some Medium Volatile bituminous coals, may be partially graphitizable.

The agglomerating bituminous coal used to prepare the high density carbon foams is first comminuted. In some embodiments, the coal is comminuted to a size such that substantially all, or greater than about 98%, of the coal will pass through an 80 mesh screen (U.S. Standard Sieve Series). Such 80 mesh screens have openings of about 0.18 mm. In other embodiments, the coal is comminuted to a size such that substantially all, or greater than about 98%, of the coal will pass through a 140 mesh screen (U.S. Standard Sieve Series). Such 140 mesh screens have openings of about 0.105 mm. In still other embodiments, suitable coals comminuted to other mesh sizes may also be utilized. In various embodiments, the coal may be comminuted to sizes below about 0.42 mm, in other embodiments below about 0.18 mm, and in yet other embodiment below about 0.105 mm.

Figure 1:
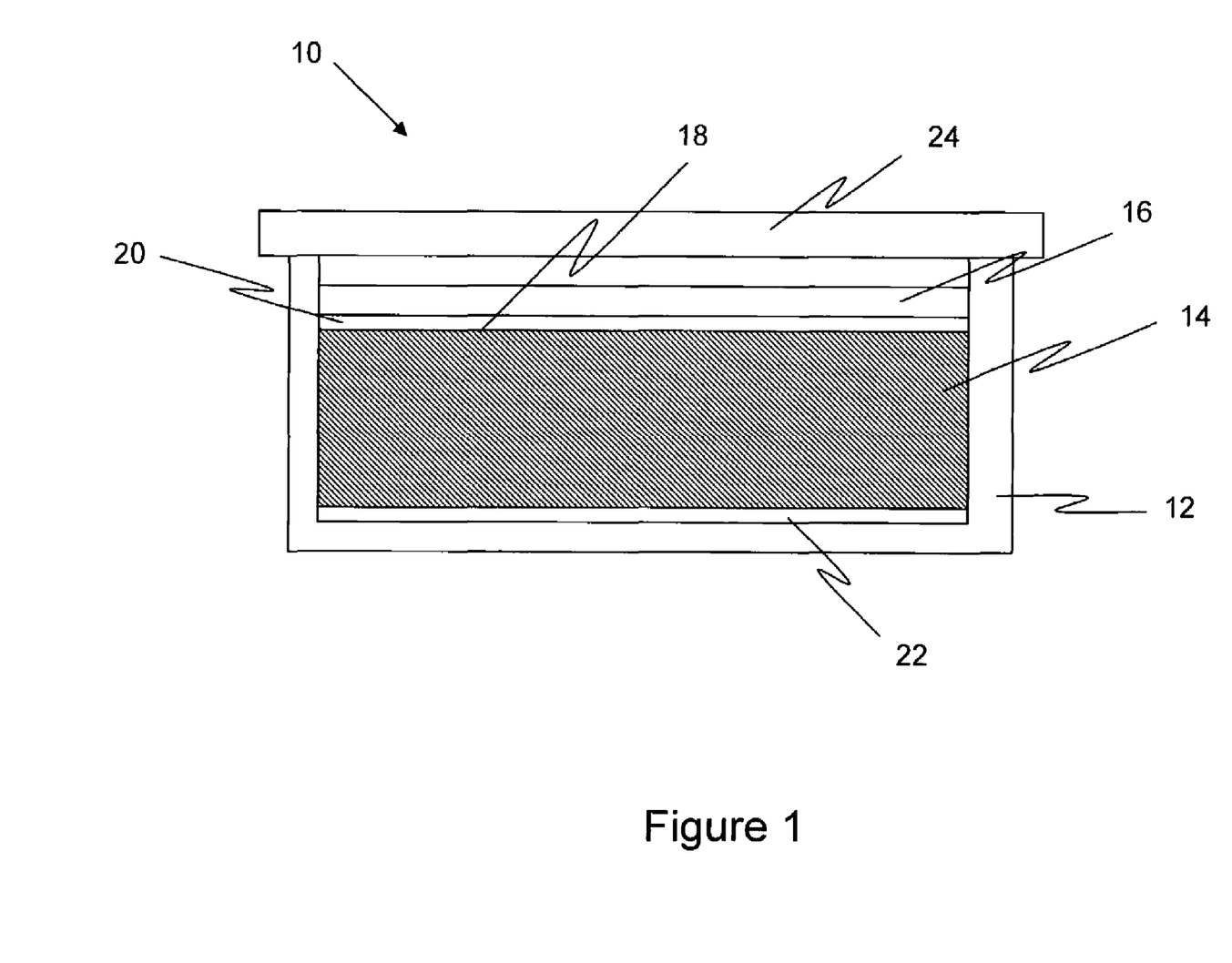
FIG. 1 is a diagrammatic, cross-sectional representation of a container loaded with comminuted coal.

With reference now to FIG. 1, there is shown an embodiment of a high density carbon foam forming apparatus 10 that generally includes a container 12. After sizing, the comminuted coal 14 is placed into a container 12. The container 12 may have any shape or design. In certain embodiments a flat bottom pan is utilized. The container 12 may optionally include a lid 24. The amount of the comminuted coal 14 loaded in the container 12 is not particularly limited. In some embodiments, a sufficient quantity of coal is utilized such that a coal bed is produced wherein the coal particles comprising that coal bed are in mutual contact with neighboring coal particles. In certain embodiments, the mass of coal placed in the container averages about 13 grams per square inch of the container bottom surface area. Other coal loadings may be used to provide the resultant coal bed in the container. The container 12 may be fabricated from any material that is not significantly affected by the selected process conditions of temperature and pressure. Additionally, the container material(s) of construction should not be significantly wet by the plastic coal or significantly degraded by exposure to the coal or coal products at the selected process conditions. Furthermore, container material(s) of construction may be selected with respect to the thermal transport properties and/or dimensional stability of the material(s) of construction over the desired process conditions. Some suitable materials of construction of the container may include, but are not limited to, ceramic materials and metals, including aluminum, stainless steel, and other similar materials.

Generally, the container interior bottom surface may be clean and smooth. Multiple uses of a given container may degrade the bottom interior container surface, due to, for example, the build-up of residues from previous foam production and exposure to the associated process conditions and gases. Such degradation may negatively impact the appearance, smoothness, and/or integrity of the bottom surface of the high density carbon foam product. The container bottom surface may be cleaned by conventional methods such as, but not limited to, washing, the use of abrasives, and the like. Alternatively, a thin metal foil or plate 22 may be placed over the container bottom prior to the introduction of the coal. As with the container bottom, such a metal foil or plate, which may be referred to as a bottom surface covering, 22 may be cleaned as necessary to provide a clean and smooth surface for contact with the coal. In some embodiments, aluminum foil is used as the bottom surface covering metal foil. The use of aluminum foil may provide for a bottom surface covering that is economically disposable after each use, thus eliminating or reducing the need for cleaning of the container or bottom surface covering. Additionally, the use of a bottom surface covering, such as aluminum foil, may provide for easier extraction of the resultant high density carbon foam from the container.

Other materials may be substituted for the metal foils or plates used as bottom surface coverings 22. The metal foils, metal plates, and other materials may be sheet materials having at least one face with a smooth solid surface. These metal foils, metal plates, and other materials, should be capable of tolerating the process temperatures and pressures used in production of the high density carbon foam. Additionally, the bottom surface covering 22 should be essentially non-reactive with the feedstock coal or any products thereof. Furthermore, it is desirous that the bottom surface covering 22 should not be significantly wetted by the feedstock coal when plastic. Preferably, the bottom surface covering 22 should not significantly absorb or adsorb the feedstock coal when plastic. In some embodiments the bottom surface covering material provides for good heat transport between the container bottom and the feedstock coal and resultant high density carbon foam. Suitable bottom covering materials 22 may include metal foils and sheets, non-porous or glazed ceramic plates, papers, or sheets, and the like. Bottom surface coverings may be perforated with one or more holes, typically of small diameter. Other embodiments may include graphite, or carbon, foils or sheets that satisfy the above discussed criteria as the bottom surface covering. It is generally preferable that the smooth surface of the bottom surface covering 22 which contacts the feedstock coal be substantially free from dirt, dust, debris, coal residues, and other contaminates prior to use.

Once placed in the container, typically, the comminuted coal 14 is uniformly distributed on the container bottom. In some embodiments, the resulting coal bed may be compacted. Compaction results in the densification of the bed of comminuted coal. Such densification may provide for increased high density carbon foam densities. Compaction may also inhibit the formation of cracks, fissures, or other large void volumes on or within the high density carbon foam. Compaction may be accomplished by tamping, vibration, or the application of a force (i.e., a compaction force), to compact the comminuted coal particles. Typically, the compaction force is not sufficient to cause the coal bed to become a self-supporting coherent mass. However, in other embodiments, the compaction force may be sufficient to cause the coal bed to become a self-supporting coherent mass. In embodiments, where a compaction force sufficient to cause the coal bed to become a self-supporting coherent mass is utilized, the coal may be compacted prior to introduction into the container 12.

After being placed in the container 12, the top surface 18 of the coal bed may be optionally covered with a rigid sheet material 16. The rigid sheet material 16, which may also be referred to as a coal cover, may be a metal sheet, a metal plate, or other material that has at least one face with a smooth, substantially solid surface. The smooth, substantially solid surface is preferably placed against the top of the coal feedstock bed. Suitable rigid metal sheets, metal plates, and other materials, should be capable of tolerating the process temperatures and pressures used in production of the high density carbon foam. Additionally, the rigid sheet material 16 should be essentially non-reactive with the feedstock coal or any products thereof. Furthermore, the rigid sheet material 16 should not be significantly wetted by the plastic feedstock coal. Preferably, the rigid sheet material 16 should not significantly absorb or adsorb the plastic feedstock coal. In certain embodiments, the rigid sheet material 16 may provide for good heat transport between the atmosphere above the rigid sheet material and the feedstock coal or resultant high density carbon foam under the rigid sheet material. Suitable rigid sheet materials 16 may include metal sheets and plates, non-porous or glazed ceramic plates or sheets, and the like. Other embodiments may include graphite, or carbon, sheets that satisfy the above discussed criteria as the rigid sheet material. It is generally preferable that the smooth surface of the rigid sheet material which contacts the feedstock coal be substantially free from dirt, dust, debris, coal residues, and other contaminates prior to use. Examples of a suitable rigid sheet material 16 include, but are not limited to, 1/16" thick aluminum plate, 1/8" thick aluminum plate, and about 0.070" thick 316 stainless steel sheet.

As desired, a top surface covering 20 may be placed between the top of the coal bed 18 and the bottom surface of the rigid sheet material 16. Optionally, a top surface covering may be placed on top of the coal bed even if a rigid sheet material is not used. The same type of materials as used for bottom surface coverings may be used as the top surface covering 20. For example, aluminum foil may be placed between the coal bed 14 and the rigid sheet material 16. When so placed, such materials serve very much the same type of function(s) as do bottom surface coverings. Therefore, the useable types and desired characteristics of these materials are essentially the same as for bottom surface coverings.

In certain embodiments, the compressive force exerted on the coal bed by the rigid sheet material, if utilized, may be optimized. Generally, for a given set of process conditions, the density and strength of the resultant high density carbon foam may increase as the compressive force exerted by the rigid sheet material increases. However, the compressive force should not be so large as to result in the softened coal forming a nonporous mass. If such a nonporous mass is formed, the softened coal may swell during the heating step and form low density carbon foam. Other factors limiting the compressive force maximum may include, for example, practicality, container size, and heat transfer limitations. Effective compressive forces do not have to be large. For example, forces as low as about 0.02 pounds per square inch of coal bed top surface area have been found to positively impact the formation of high density carbon foams for some coals and process conditions. For other coals and process conditions, forces of 0.2 pounds per square inch have resulted in very high quality high density carbon foams. The compressive force may be increased by increasing the mass of the rigid sheet material. Increasing the mass of the rigid sheet material often results in increases to its thickness, which in turn, has the undesired consequence of lower heat transfer ability.

Rather than increasing the thickness of the rigid sheet material to increase its mass and the compressive force on the coal bed, the compressive force may also be increased by the use of one or more weights. The weight(s) may be placed on the upper surface, or connected to, the rigid sheet material to further increase the compressive force. As desired, a weight may have projections, such as legs, so that the mass of the weight contributes to the compressive force exerted on the coal by the rigid sheet material but does not contact the rigid sheet material over a relatively large surface area. By this and similar methods, the use of a weight may minimally impact the heat transfer between the atmosphere above the rigid sheet material and the feedstock coal or resultant high density carbon foam under the rigid sheet material.

In some embodiments, a lid 24 of the container 12 may be placed on the container and covering the coal bed 14. It is generally advisable, but not required, that the volatile material released by the coal be retained, as much as possible, in the gas volume surrounding the coal. Incorporation of a lid 24 with the container 12 promotes this retention. Without intending to be bound by theory, it is believed that such retention promotes the softening of the coal at elevated temperatures. Certain container designs not encompassing a lid, optionally may have provision for retaining, at least for some period of time, the evolved volatile material in the gas volume (i.e. atmosphere) surrounding the coal.

The comminuted coal 14 and container 12 may then be heated to a first elevated temperature. Heating is preferably conducted under an atmosphere that is essentially inert, non-oxidizing, or otherwise non-reactive except for the gases or vapors evolved by the coal at elevated temperatures. Such an atmosphere may be partly or totally comprised of, for example, nitrogen, neon, argon, xenon, carbon dioxide, and the like. The pressure of this atmosphere may be any pressure ranging from that of the local environment (about 0 psig) to 500 psig or more. The magnitude of the first elevated temperature is sufficient to cause the coal particles to become softened (i.e., plastic), at least partially melt (i.e., to become at least partially fluid), and intermix together, where the individual coal particles substantially lose their individual characteristics and become substantially homogeneous with one another, thus forming a generally homogeneous, non-sintered, open cell carbon material. The degree to which the coal particles lose their individual characteristics or identity by melting and intermixing to form a continuous, open cell structure generally increases with increasing temperature to at least the first elevated temperature. Typically, the greater the degree to which the coal particles melt and intermix together, the greater the strength of the high density carbon foam. Therefore it is usually preferred to use as high a first elevated temperature as possible within the limits of control of the process. Heating the coal to too high a temperature, that is, a temperature that is greater than the first elevated temperature, may result in the in the coal particles melting together to form a generally homogeneous, closed cell carbon material. This closed cell carbon material may develop into a low density carbon foam, or coke, with continued heating. Therefore, a first elevated temperature may be a temperature less than that at which a closed cell carbon material develops. In certain embodiments, the first elevated temperature is a temperature just less than that temperature at which a closed cell carbon material develops. For those coals that, due to process conditions or other reasons, do not exhibit the required fluidity at elevated temperatures to form a closed cell carbon material, the first elevated temperature may be a temperature which maximizes the softening of the coal. In certain embodiments, this elevated temperature will result in the maximizing of the density of the resultant high density carbon foam.

The coal bed may be heated at a relatively high (i.e. rapid) rate until some portion of the coal bed achieves a temperature sufficient for the coal to become just slightly softened. From that temperature to the first elevated temperature, heating may be performed at a rate such that cracking of the resultant high density carbon foam and/or the development of other non-uniform properties within the foam are avoided. Such cracking and/or non-uniform properties in the resultant high density carbon foam may be due, for example, to the development of significant temperature gradients within the foam as a result of heating at a high rate. During the process of heating the coal bed to the first elevated temperature, the coal mass comprising the coal bed transforms into a generally homogeneous, non-sintered, open cell carbon material.

Once the carbon material achieves the first elevated temperature and a generally homogeneous, non-sintered, open cell carbon material is formed, heating may be continued at that temperature, or a lower temperature, until the resultant generally homogeneous, non-sintered, open cell carbon material is no longer plastic or capable of becoming plastic. That is, heating may be continued until the generally homogeneous, non-sintered, open cell carbon material is no longer capable of being substantially softened. Alternatively, the generally homogeneous, non-sintered, open cell carbon material may be heated to temperatures greater than the first elevated temperature if such heating is conducted at a rate, typically a slow rate from about 0.01 to about 0.5° C./min, such that the thermoplastic character of the generally homogeneous, non-sintered, open cell carbon material decreases with increasing temperature above the first elevated temperature. That is, the generally homogeneous, non-sintered, open cell carbon material may be heated to temperatures greater than the first elevated temperature if the carbon material of the generally homogeneous, non-sintered, open cell carbon material becomes no more softened or plastic at those elevated temperatures than the carbon material was at the first elevated temperature. Heating of the carbon material at such elevated temperatures may be for a period of time sufficient to essentially eliminate the plastic character of the generally homogeneous, non-sintered, open cell carbon material.

Once the generally homogeneous, non-sintered, open cell carbon material is essentially no longer plastic, the resulting material is now high density carbon foam. As desired, the resultant high density carbon foam may be cooled to essentially ambient temperatures or immediately or subsequently heated to a second elevated temperature as great as about 3200° C., followed by cooling. Various properties of the resulting high density carbon foam may be greatly improved by such heating to elevated temperatures, with subsequent cooling, following preparation. Such properties may include, but are not limited to, mechanical strength, including crush strength, and electrical conductivity. In some embodiments, such second elevated temperatures may be greater than about 700° C., and more typically greater than about 950° C. Both heating and cooling should be conducted at rates such that undesired cracking, or other degradation, of the foam does not occur. Such degradation may be the result of for example, significant thermal gradients produced within the foam. In certain embodiments, such heating or cooling may be conducted in an essentially inert, non-oxidizing, or otherwise non-reactive atmosphere.

For a given coal, the value of the first elevated temperature is affected by a number of process variables. Generally, higher process atmospheric pressures may widen the range and lower the values of the range of temperatures suitable for forming the high density carbon foams. That is, the value of the first elevated temperature may decrease, and a wider range of temperatures may be useable as first elevated temperatures, with increasing process atmospheric pressures. Without intending to be bound by theory, it is believed that higher process pressures appear to increase the plastic (i.e. thermoplastic) nature of the coal which in turn may provide for improved (i.e. higher) product high density carbon foam densities and strengths.

Additionally, longer heating times at elevated temperatures, even those elevated temperatures less than or equal to the first elevated temperature, may reduce the plastic properties of the coal such that the first elevated temperature is shifted to higher values of temperature. In some instances, as a result of longer heating times at elevated temperatures, a coal may not become sufficiently plastic to produce a high density carbon foam as dense as might otherwise be produced. If heating at elevated temperatures significantly less than the first elevated temperature is excessively long, a sintered product, rather than carbon foam, may be produced. Such sintered products may exhibit low strengths as compared to high density carbon foams.

It is expected that the plastic properties of all coals may be impacted by exposure to elevated temperatures of sufficient magnitude. Therefore, in some embodiments, temperatures useable as a first elevated temperature for coals exhibiting high degrees of fluidity, when heated, may be limited to a very narrow range of temperatures. Conversely, in other embodiments, temperatures useable as a first elevated temperature for coals exhibiting low degrees of fluidity, when heated, may be selected from a wider range of temperatures.

For some bituminous coals, the first elevated temperature may be approximately the "Initial Dilatation Temperature" as determined using an Amu/Ruhr Dilatometer (ASTM D5515 "Standard Test Method for Determination of the Swelling Properties of Bituminous Coal Using a Dilatometer"). The value of the "Initial Dilation Temperature" is specific to each coal sample being tested. As discussed above, the process conditions to which the coal is subjected in forming the high density carbon foam may impact the temperature at which the optimum first elevated temperature is evident. Slow heating to the first elevated temperature may increase the value of this temperature to values above the "Initial Dilatation Temperature". Heating of the coal mass under high process atmospheric pressures may lower the value of the optimum first elevated temperature to values significantly less than the "Initial Dilatation Temperature". Therefore, while values such as the "Initial Dilatation Temperature" may provide some guidance for selection or prediction of the optimum first elevated temperature, the process variables impact heavily on the on the value of the optimum first elevated temperature. As such, experimental investigations utilizing a specific feedstock coal and process condition range are recommended for establishment of the optimum first elevated temperature and other relevant process conditions.

Additionally, it is generally not desired that the coal or resultant open cell carbon material be exposed to oxygen during processing. Such exposure can negatively impact the fluidity that may be developed by the coal and may result in an inferior high density carbon foam product.

High density carbon foam produced directly from comminuted coal particles may have carbon as the main constituent. However, other non-volatile coal constituents will also be present in the high density carbon foam material. The high density carbon foam may exhibit an ash content and ash constituents reflecting those of the feedstock from which the high density carbon foam was prepared. Commonly, for coal feedstocks, such ash contents may be above about 1% by weight. Generally, in some embodiments, the ash content of high density carbon foam prepared from coal may have a value ranging from about 1% to about 20% by weight ash. In other embodiments, the ash content of high density carbon foam prepared from coal may have a value ranging from about 2% to about 20% by weight ash. In still other embodiments, the ash content of high density carbon foam prepared from coal may have a value ranging from about 5% to about 20% by weight ash. Further, the high density carbon foams, when heated to temperatures greater than about 700° C., and more typically greater than about 950° C., followed by cooling to essentially ambient temperatures, may have crush strengths (i.e., compressive strengths as defined by ASTM C368) greater than about 5,000 lbs/in$^2$, in some embodiments greater than about 10,000 lbs/in$^2$, and in some embodiments greater than about 20,000 lbs/in$^2$. In certain embodiments, the high density carbon foams may exhibit crush strengths ranging from about 5,000 lbs/in$^2$ to about 25,000 lbs/in$^2$. The body of these high density carbon foams may be largely isotropic. For a given coal feedstock, the crush strength generally increases with the density of the resultant high density carbon foam product.

While the description above is provided with respect to using agglomerating coal as the agglomerating carbonaceous feedstock, it is expected that other solid agglomerating carbon-based materials may used as the feedstock for high density carbon foam production. Solid carbonaceous materials that may be comminuted, and agglomerate, and become temporarily plastic when heated, may be potentially utilized as a feedstock. For example, other feedstocks may include, but are not limited to, solvent refined coal, coal extracts, hydrogenated coal extracts, solvent refined coals, and mesophase materials that are solids which become at least temporarily plastic and agglomerate when heated. In some embodiments, coal pitch, synthetic pitches, petroleum pitch, mesophase pitch, resins, including phenolics, and the like, may be used in combination with one or more of the solid agglomerating material feedstocks discussed above to form a high density carbon foam.

The coal bed within the container may be divided into two or more sections by the use of one or more partitions. The resulting sections of the coal bed may then be simultaneously processed within the container, as discussed above, to provide sections of high density carbon foam. As desired, the resultant high density carbon foam sections may be cooled to essentially ambient temperatures or immediately or subsequently heated to a second elevated temperature as great as about 3200° C., followed by cooling. In certain embodiments, such heating or cooling may be conducted in an essentially inert, non-oxidizing, or otherwise non-reactive atmosphere.

The partitions used to divide the coal bed may be comprised of any material that is not significantly affected by the selected process conditions of temperature and pressure. Additionally, the partition material(s) of construction should not be significantly wet by the plastic coal or significantly degraded by exposure to the coal or coal products at the selected process conditions. Furthermore, partition material(s) of construction may be selected with respect to the thermal transport properties and/or dimensional stability of the material(s) of construction over the desired process conditions. Some suitable materials of construction of the partition may be, but are not limited to, ceramic materials and metals, including aluminum, stainless steel, and other similar materials. In some embodiments, the partition is comprised of a relatively thin, sheet-like, material. In other embodiments, the partition may comprise a relatively thick, bar-like, material. One or more sections of material may comprise the partition. Additionally, partitions may be comprised of more than one type of material. In some embodiments, the partition may have a simple geometric shape. In other embodiments, the partition may have a complex geometric shape.

One or more partitions may be used to divide the coal bed. The resulting divisions of the coal bed do not have to be equivalent in size or volume. Partitions may divide the coal bed either horizontally or vertically. In some embodiments, a partition, or a combination of partitions, may essentially divide the coal bed into two or more sections. The partition, or the combination of partitions, may then essentially divide the resulting high density carbon foam into two or more sections. A partition, or a combination of partitions, may approximately contact the container walls contacted by the coal bed. In some embodiments, partitions, or a combination of partitions may be used in combination with bottom surface coverings, coal bed coverings, rigid sheet materials, and/or weights. In some embodiments, bottom surface coverings, coal bed coverings, or rigid sheet materials may contact or cover only a portion of the top or bottom surface of a coal bed or a section of a coal bed.

The shape of the resultant high density carbon foam product sections will be dependent on, and reflect, the shape of coal bed sections from which they were produced. In turn, the shape of the coal bed sections is defined by the shape of any solid material that at least partially constrains the coal bed during its conversion to the high density carbon foam. Such solid materials may be those comprising the container walls, partitions, bottom surface coverings, coal bed coverings, rigid sheet materials, and the like. Therefore, high density carbon foam sections of various shapes and configuration may be produced by incorporating such shapes and configurations into the design of the container walls, partitions, the container walls, bottom surface coverings, coal bed coverings, rigid sheet materials, and the like.

Figure 2:
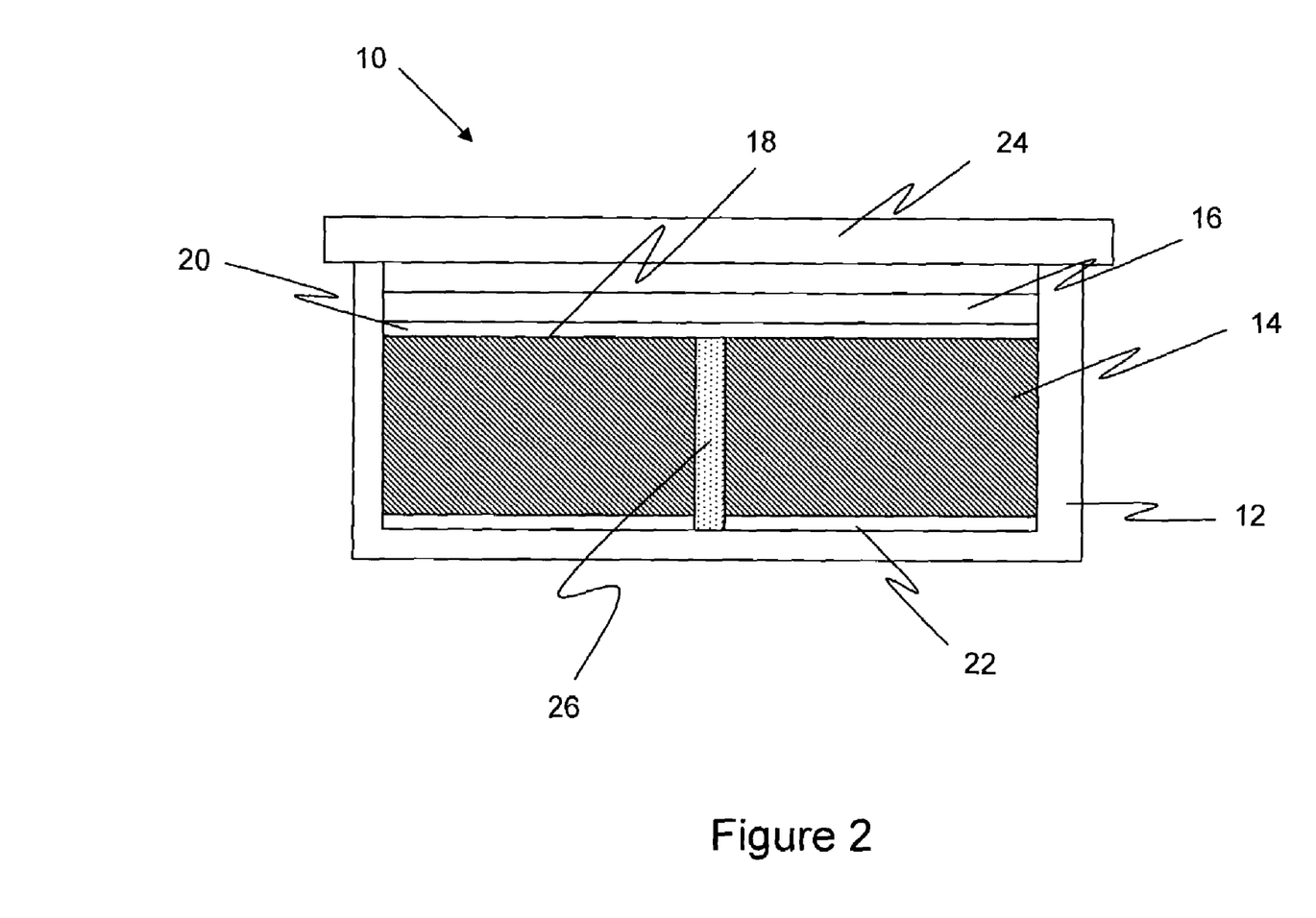
FIG. 2 is a diagrammatic, cross-sectional representation of a partition dividing a coal bed into two sections within a container in accordance with an embodiment of the invention.

In some embodiments, a partition may at least partially divide a coal bed. A cross-sectional representation of such a partition dividing a coal bed is provided in FIG. 2. As shown in this Figure, a generally partition 26 divides the coal bed into two sections. The partition 26 is a sheet-like material positioned such that its thin dimension is parallel to the width of the coal bed 14. In this example, the partition 26 is approximately the same height as the coal bed 14. Partitions shorter or higher than the coal bed may also be used. There are essentially no limitations on the use of partitions extending higher than the coal bed, other than those associated with practicality. However, in some embodiments, there may be limitations on the use of partitions shorter than the coal bed. During processing, the volume of the coal bed may decrease as the coal bed is converted to high density carbon foam. That is, the volume of the resulting high density carbon foam may be less than that volume of the coal bed from which the carbon foam was prepared. In some embodiments, partitions shorter than the coal bed may still be higher than the resulting high density carbon foam. In such embodiments, sections of high density carbon foam having the desired geometries may be produced although some evidence of at least partial attachment to neighboring carbon foam sections may be evident. However, in other embodiments, the partition may be significantly shorter than the resulting high density carbon foam. In such embodiments, the sections of high density carbon foam may still be partially connected together which may lead to breakage of the foam. Routine testing may readily establish the minimum partition height, for dividing a coal bed, which results in the production of high density carbon foams without excessive breakage.

Figure 3:
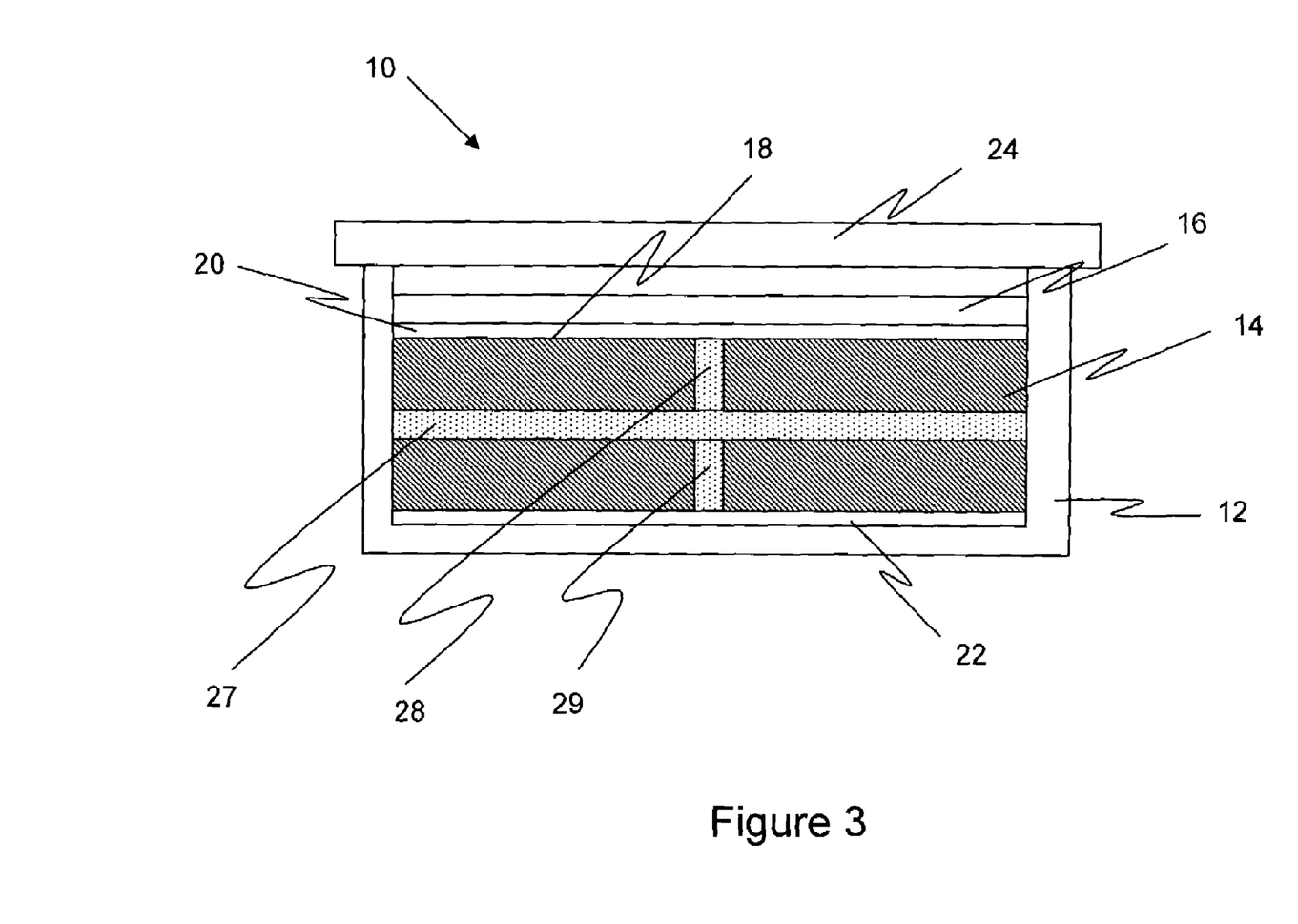
FIG. 3 is a diagrammatic, cross-sectional representation of partitions dividing a coal bed into four sections within a container in accordance with an embodiment of the invention.

In some embodiments, a partition may be positioned to at least partially divide a coal bed into upper and lower sections. Such partitions may essentially extend to the side walls of the container. A cross-sectional representation of such a partition dividing a coal bed into upper and lower sections is provided in FIG. 3. As shown in this Figure, a partition 27 divides the coal bed into upper and lower sections. The partition 27 is a sheet-like material positioned such that its thin dimension is parallel to the depth of the coal bed. This sheet-like material essentially extends to the side walls of the container. Also shown in this Figure are two partitions 28, 29 further dividing the coal bed into additional sections. Therefore, in this illustration, the coal bed is divided into four sections. It is therefore expected that the partitioned coal bed, after processing, would provide four sections of high density carbon foam of the predetermined configuration.

Figure 4:
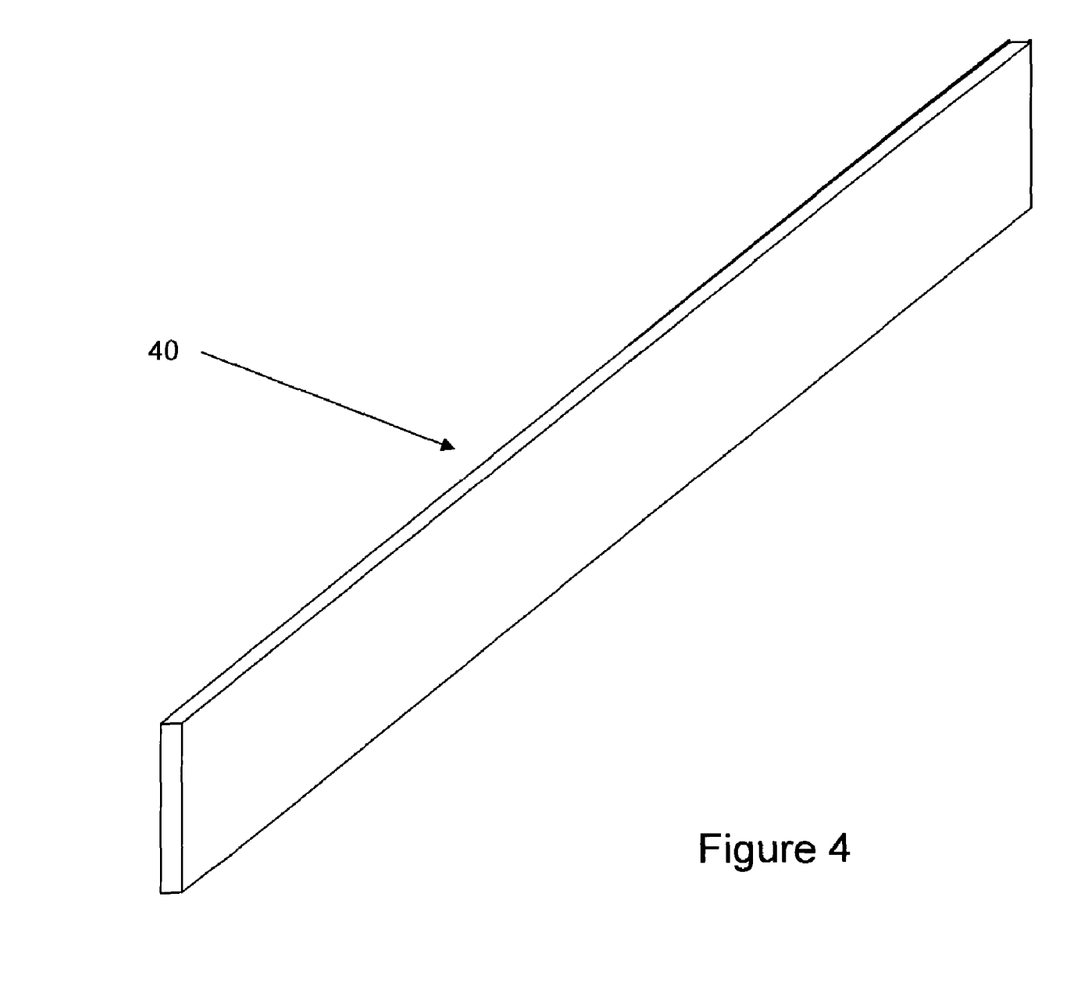
FIG. 4 is a diagrammatic perspective representation of a partition for one embodiment of the invention.
Figure 5:
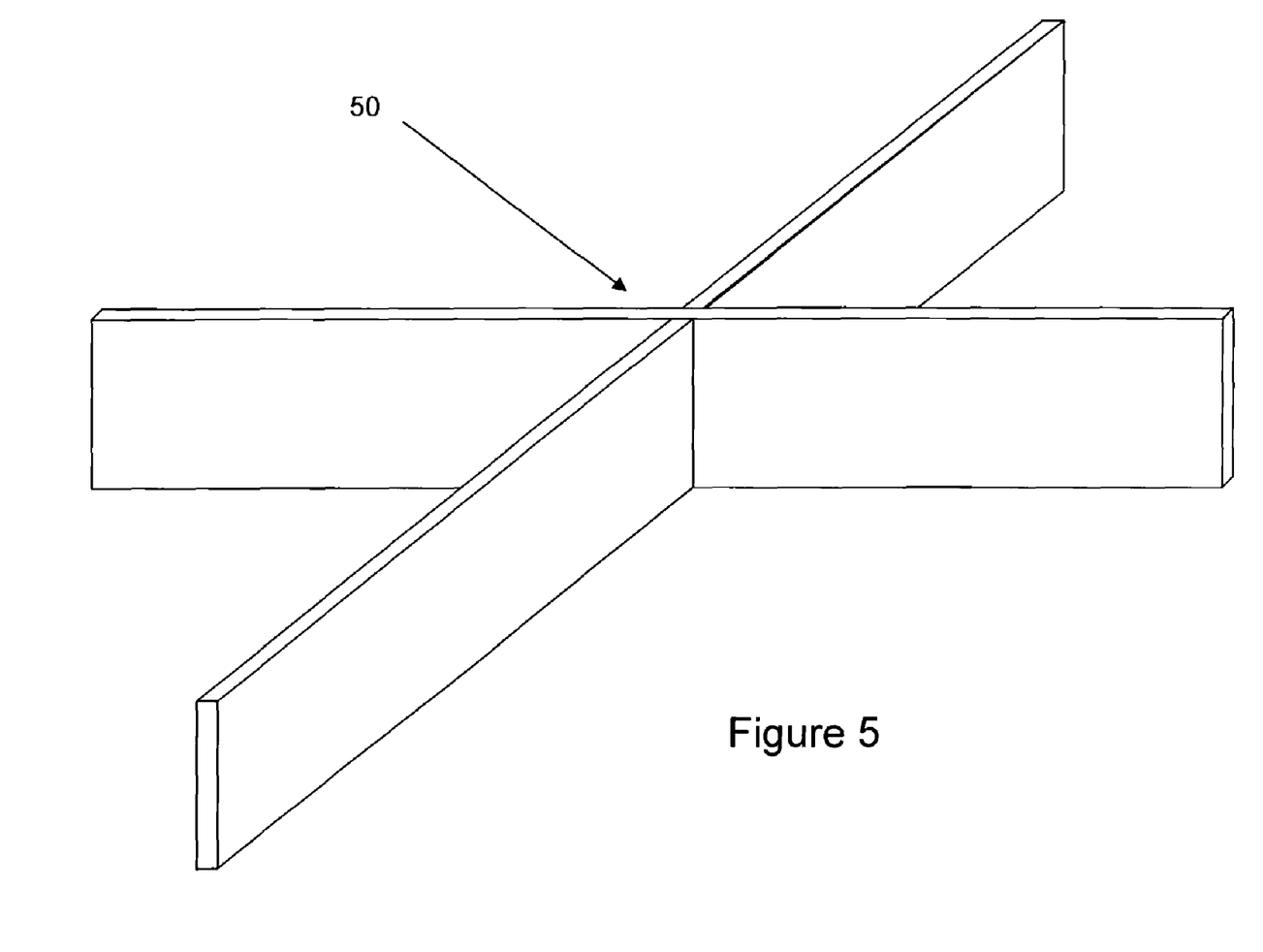
FIG. 5 is a diagrammatic perspective representation of a partition for another embodiment of the invention.
Figure 6:
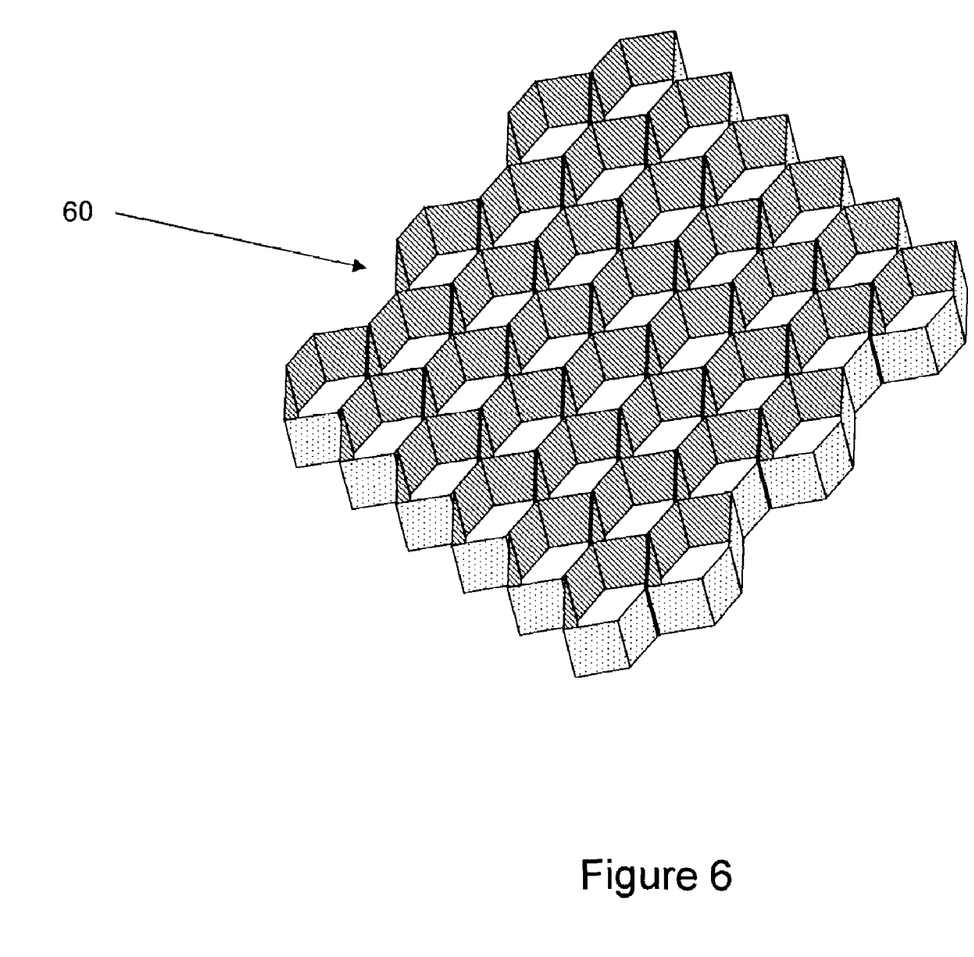
FIG. 6 is a diagrammatic perspective representation of a partition for yet another embodiment of the invention.

Partitions may have relatively simple or complex shapes. For example, FIG. 4 provides an illustration of a perspective view of a very simple partition. This partition 40 is a thin rectangular bar. Such a partition may be used to divide a coal bed in a container having a width essentially equal to the length of the bar. Partitions of this type may provide for the simultaneous production of two sections of high density carbon foam. FIG. 5 provides an illustration of a perspective view of a slightly more complex partition. This partition 50 is comprised of thin rectangular bars assembled to provide a cross-like geometry. Such a partition may be used to divide a coal bed in a container into four sections. For round containers, such a division may provide for the simultaneous production of four equivalent arc sections of high density carbon foam. In a square container, such a partition would provide for the simultaneous production of four square sections of high density carbon foam. FIG. 6 provides an illustration of a perspective view of an even more complex partition. This partition 60 is a metal honeycomb such as that commonly used for strengthening wall panels and the like. Such a partition may provide for the simultaneous production of numerous sections of high density carbon foam having hexagonal cross sections and essentially flat top and bottom surfaces. Therefore, partitions may be so designed as to impart desired geometric configurations or shapes to the individual sections of high density carbon foam produced in a single container.

The following examples are provided for illustrative purposes only with respect to certain embodiments of the invention and are not intended to limit the scope of the invention.

EXAMPLE 1

A first piece of ½" thick ½" aluminum honeycomb sheet, such as that illustrated in FIG. 6, was fitted into a flat bottom container such that it extended to the container walls and essentially uniformly covered the container bottom. An agglomerating bituminous coal that may be classified as a Low Volatile bituminous coal, was comminuted to a particle size nominally less than about 140 mesh (U.S. Standard Series sieves). A portion of this comminuted coal was placed into the flat bottom container to provide an essentially uniform loading of coal in the cells of the aluminum honeycomb sheet covering the container bottom. The coal loading was approximately 7 g/in$^2$ of container bottom surface area. A piece of aluminum foil sized to the container interior cross-section dimensions was then placed on top of the coal bed and aluminum honeycomb. A second piece of aluminum honey-comb, of essentially the same size as the first piece, was then placed in the container such that it covered the piece of aluminum foil. A second portion of the comminuted coal was placed into the flat bottom container to provide an essentially uniform loading of coal in the cells of the second aluminum honeycomb sheet. The coal loading of the second aluminum honeycomb sheet was approximately 6 g/in$^2$ of container bottom surface area. A second piece of aluminum foil sized to the container interior cross-section dimensions was then placed on top of the coal bed and aluminum honeycomb. A thin graphite plate was placed on top of the second piece of aluminum foil. The resulting coal bed was then compacted in the container by dropping the container a number of times from the height of a few inches.

Figure 7:
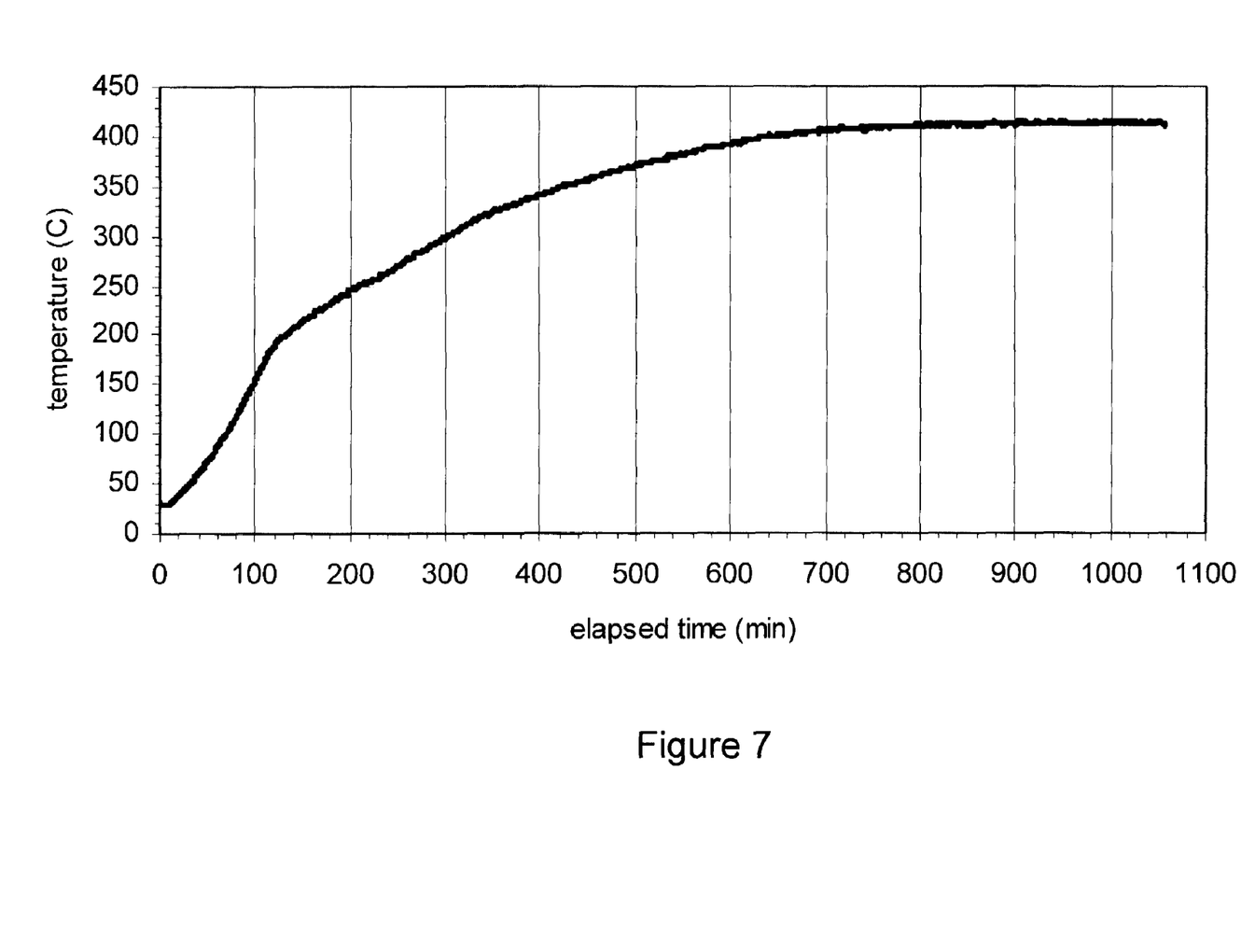
FIG. 7 is a plot showing a temperature program used to simultaneously produce sections of high density carbon foam in accordance with an embodiment of the invention.

Under an essentially inert, non-oxidizing, atmosphere at a pressure between about 400 psig and about 460 psig, the container was then heated using the temperature profile shown in FIG. 7. Following this heating, the container was slowly cooled to ambient temperature. During cooling, when the container temperature was about 100° C., the pressure of the essentially inert, non-oxidizing, atmosphere was reduced to about ambient pressure.

The resulting high density carbon foam was in a large number of sections, each section having a hexagonal cross-sectional shape reflecting the cell shape of the aluminum honeycomb. Such high density carbon foam sections were produced in both the first and second aluminum honeycomb. The top and bottom surfaces of the high density carbon foam sections were essentially flat. The hexagonal shaped high density carbon foam sections were then heated under an essentially inert, non-oxidizing atmosphere to a temperature of greater than about 900° C. The sections were cooled form this temperature under an essentially inert, non-oxidizing atmosphere to essentially ambient temperature. The resulting sections maintained their shape and were found to be hard and abrasion resistant.

EXAMPLE 2

The same type of bituminous coal as used in example 1 was comminuted to a particle size less than about 140 mesh (U.S. Standard Series sieves). A portion of this comminuted coal was placed in a flat bottom square container to provide an essentially uniform loading of about 12.4 g/in$^2$ of bottom surface area. The container had been fitted with a perforated aluminum foil bottom surface covering prior to introduction of the coal. The coal bed was divided by inserting a cross-like partition, configured much as that shown in FIG. 5, into the coal bed. This partition was fabricated from ⅛"×⅝" stainless steel rectangular bar. The ends of the partition extended to essentially the walls of the container. Next, the coal bed and partition were covered with a sheet of perforated aluminum foil to provide a coal bed covering. An about 0.07 inch thick stainless steel plate was then placed over the coal bed covering. Weights were added to the stainless steel plate such that a compressive force of about 0.04 lb/in$^2$ was applied to the top of the coal bed. A lid was then placed on the container.

Under an essentially inert, non-oxidizing, atmosphere at a pressure between about 200 psig and about 400 psig, the container and coal were then heated from room temperature to about 581° F. at a rate of about 3.3° F./min, then to about 689° F. at a rate of about 2.2° F./min, and then to about 770° F. at a rate of about 0.64° F./min. The container and its contents were than held at the temperature of about 770° F. for about 8 hours, followed by cooling to essentially ambient temperature at a rate of about 2° F. During cooling, when the container temperature was about 100° C., the pressure of the essentially inert, non-oxidizing, atmosphere was reduced to about ambient pressure.

Four sections of high density carbon foam were produced in the container by this method. The resulting sections of high density carbon foam were then heated under an essentially inert, non-oxidizing, atmosphere to a temperature of greater than about 997° C. Based on high density carbons prepared from the same coal using similar temperature profiles, the resultant carbon foam sections are-expected to exhibit densities greater than about 90 lbs/ft$^3$ (1.4 g/cc) and crush strengths greater than about 20,000 lbs/in$^2$.

While the invention has been described above in detail with respect to certain embodiments, the present invention is limited only by the following claims.

What is claimed is:

1. A method for producing at least two sections of high density carbon foam within a single container, the method comprising the steps of:
   dividing a coal bed into at least two coal bed sections in a container, wherein the coal bed comprises comminuted agglomerating bituminous coal;
   simultaneously heating the at least two coal bed sections to a first elevated temperature, wherein the first elevated temperature is sufficient to convert said at least two coal bed sections into at least two substantially homogeneous, non-sintered, open cell carbon materials; and
   continued heating of the at least two substantially homogeneous, non-sintered, open cell carbon materials at an elevated temperature for a time sufficient to essentially eliminate the plastic properties of the at least two substantially homogeneous, non-sintered, open cell carbon materials to provide at least two sections of high density carbon foam.

2. The method of claim 1, further comprising the step of heating said high density carbon foam to a second elevated temperature greater than about 700° C.

3. The method of claim 2, wherein said second elevated temperature is greater than about 950° C.

4. The method of claim 1, wherein said heating is conducted under an essentially inert, non-oxidizing atmosphere.

5. The method of claim 2, wherein said heating is conducted under an essentially inert, non-oxidizing atmosphere.

6. The method of claim 3, wherein said heating is conducted under an essentially inert, non-oxidizing atmosphere.

7. The method of claim 1, further comprising the step of cooling said high density carbon foam to essentially ambient temperature under an essentially inert, non-oxidizing atmosphere.

8. The method of claim 2, further comprising the step of cooling said high density carbon foam to essentially ambient temperature under an essentially inert, non-oxidizing atmosphere.

9. The method of claim 3, further comprising the step of cooling said high density carbon foam from said to essentially ambient temperature under an essentially inert, non-oxidizing atmosphere.

10. The method of claim 1, further comprising the step of compacting at least one coal bed section.

11. The method of claim 1, further comprising the step of covering the container with a lid prior to heating said at least two coal bed sections.

12. The method of claim 1, further comprising the step of placing a bottom surface covering in said container prior to introduction of said comminuted agglomerating bituminous coal.

13. The method of claim 1, further comprising the step of covering a least a portion of one coal bed top surface with a coal bed covering.

14. The method of claim 13, further comprising the step of covering a least a portion of a coal bed covering with a rigid sheet material.

15. The method of claim 1, further comprising the step of covering a least a portion of at least one of a coal bed top surface with a rigid sheet material.

16. The method of claim 1, further comprising the step of compacting at least a portion of at least one coal bed section, wherein said compacting of at least a portion of at least one coal bed section is performed prior to introduction of the coal into the container.

17. The method of claim 1, wherein said atmosphere has a pressure between about 0 psig and 500 psig.

18. The method of claim 7, further comprising the step of heating said high density carbon foam to a second elevated temperature greater than about 700° C. after said cooling.

19. The method of claim 18, wherein said second elevated temperature is greater than about 950° C.

20. The method of claim 18, wherein said heating is conducted under an essentially inert, non-oxidizing atmosphere.

21. The method of claim 19, wherein said heating is conducted under an essentially inert, non-oxidizing atmosphere.

* * * * *